US010489565B2

United States Patent
Jurss et al.

(10) Patent No.: US 10,489,565 B2
(45) Date of Patent: Nov. 26, 2019

(54) COMPROMISE ALERT AND REISSUANCE

(71) Applicant: VISA INTERNATIONAL SERVICE ASSOCIATION, San Francisco, CA (US)

(72) Inventors: Penny Jurss, Pewaukee, WI (US); George Perry, Oakland, CA (US); Joseph Vause, San Mateo, CA (US); Joseph Parvis, San Francisco, CA (US); Joseph Chouinard, San Mateo, CA (US); Gloria Mai, Larkspur, CA (US); Matthew Wick, Centennial, CO (US)

(73) Assignee: Visa International Service Association, San Francisco, CA (US)

(*) Notice: Subject to any disclaimer, the term of this patent is extended or adjusted under 35 U.S.C. 154(b) by 157 days.

(21) Appl. No.: 15/613,581

(22) Filed: Jun. 5, 2017

(65) Prior Publication Data

US 2017/0353436 A1     Dec. 7, 2017

Related U.S. Application Data

(60) Provisional application No. 62/345,664, filed on Jun. 3, 2016.

(51) Int. Cl.
| | |
|---|---|
| *G06F 21/31* | (2013.01) |
| *G06F 21/55* | (2013.01) |
| *G06F 21/45* | (2013.01) |
| *H04L 29/06* | (2006.01) |

(52) U.S. Cl.
CPC .............. *G06F 21/31* (2013.01); *G06F 21/45* (2013.01); *G06F 21/554* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 9,838,384 B1 * | 12/2017 | Kane-Parry | H04L 63/083 |
| 2002/0078345 A1 * | 6/2002 | Sandhu | H04L 9/0825 |
| | | | 713/155 |
| 2003/0135470 A1 * | 7/2003 | Beard | G06Q 20/04 |
| | | | 705/67 |
| 2007/0268837 A1 * | 11/2007 | Melton | H04L 41/0886 |
| | | | 370/252 |
| 2011/0041167 A1 * | 2/2011 | Nguyen | H04L 63/062 |
| | | | 726/6 |
| 2013/0014236 A1 * | 1/2013 | Bingell | H04L 63/0846 |
| | | | 726/6 |

(Continued)

*Primary Examiner* — Christopher A Revak

(74) *Attorney, Agent, or Firm* — Kilpatrick Townsend & Stockton LLP

(57) ABSTRACT

A user device operated by a user receives a compromise alert indicating a potentially compromised use of first access data associated with a user. The compromise alert enables the user to input a response to the compromise alert, where the response can indicate that the first access data is compromised along with a request to issue new access data for the user. The response is sent to a server computer, which then initiates a process to disable use of the first access data and generate the new access data. The new access data is transmitted to the user device. The user can utilize the new access data to request access to a resource.

18 Claims, 10 Drawing Sheets

(56) References Cited

U.S. PATENT DOCUMENTS

| | | | | |
|---|---|---|---|---|
| 2013/0268439 A1* | 10/2013 | Lowe | .................... | G06Q 20/42 |
| | | | | 705/44 |
| 2014/0059661 A1* | 2/2014 | Morinaga | ................ | G06F 21/41 |
| | | | | 726/5 |
| 2014/0109206 A1* | 4/2014 | Goel | ....................... | H04L 63/20 |
| | | | | 726/6 |
| 2014/0337937 A1* | 11/2014 | Truskovsky | ............ | H04L 63/08 |
| | | | | 726/5 |
| 2015/0026786 A1* | 1/2015 | Alexander | .......... | H04L 63/1408 |
| | | | | 726/7 |
| 2015/0134956 A1* | 5/2015 | Stachura | ............. | H04L 63/0807 |
| | | | | 713/168 |
| 2017/0109745 A1 | 4/2017 | Al-Bedaiwi | | |
| 2018/0316687 A1 | 11/2018 | Hribovsek | | |

* cited by examiner

COMPROMISE ALERT AND REISSUANCE

CROSS-REFERENCES TO RELATED APPLICATIONS

This application is a non-provisional of and claims the benefit of priority to U.S. Provisional Application No. 62/345,664, filed Jun. 3, 2016, which is hereby incorporated by reference in its entirety for all purposes.

BACKGROUND

The process for recovering from a situation in which compromising activity has been detected for access data associated with a user is cumbersome. First, the user must realize that the compromising activity has occurred. However, this is not a simple task as compromising activity is often not transparent. As a result, there is typically a delay from the time that the compromising activity occurred to the time that the user recognized that their access data may have been compromised. For example, conventional systems involve an entity that analyzes use of the user's access data to determine whether the access data may have been compromised. Upon the entity's analysis, the entity may call the user to confirm whether the access data was compromised. However, these calls typically require the user to verbally provide identification data among other authentication information, which is time-consuming and inefficient.

Additionally, after the user authorizes disabling the use of compromised access data, there is a further delay until the user can receive new access data. For example, the user may have to wait to receive paper confirmation or perform an additional registration process online or over the phone in order to receive the new access data. This delay limits the user's ability to request access to a resource, which is inconvenient. It would be desirable to provide the user with the ability to utilize the new access data as soon as possible.

Embodiments of the invention address this and other problems, individually and collectively.

BRIEF SUMMARY

Embodiments of the present invention relate to instance issuance of access data based on a response to a compromise alert by a user. One embodiment of the invention is related to a method that can be performed by a server computer. The method may comprise determining, using a compromise engine of the server computer, that first access data associated with a user has been potentially compromised and sending, by the server computer to a user device associated with the user, a compromise alert that indicates a potential compromise of the first access data associated with the user. The method may further comprise receiving, by the server computer, a request input by the user into the user device to issue second access data in response to the compromise alert and initiating, by the server computer, generation of the second access data, wherein the user can utilize the second access data to request access to a resource. The method may further comprise transmitting, by the server computer, the second access data to the user device.

In some embodiments, initiating generation of the second access data may comprise sending, by the server computer, a request to an authorization computer to issue the second access data for the user. Initiating generation of the second access data may further comprise receiving, by the server computer, the second access data from the authorization computer. The authorization computer may generate the second access data.

The method may comprise additional steps performed prior to determining that the first access data associated with the user has been potentially compromised. For example, the method may further comprise receiving, by the server computer, information indicating that a request for access to a resource was initiated using the first access data. In addition, the method may comprise generating, by the server computer, the compromise alert, and determining, by the server computer, contact information associated with the user for sending the compromise alert to the user device.

The method may comprise additional steps. For example, the method may further comprise generating, by the server computer, a token associated with the second access data, wherein the user can utilize the token to request access. The method may further comprise disabling, by the server computer, use of the first access data. In some cases, the method may further comprise receiving, by the server computer, a request for access to a resource, determining, by the server computer, that the request for access to the resource was initiated using the first access data, and declining, by the server computer, the request for access to the resource.

In other embodiments, initiating generation of the second access data may comprise invalidating, by the server computer, the first access data including a first token. Initiating generation of the second access data may further comprise generating, by the server computer, the second access data including a second token, wherein the user can utilize the second token to request access to a resource. In some embodiments, the server computer may further receive a request for access to a resource, determine that the request for access to the resource was initiated using the invalidated first access data, and decline the request for access to the resource. In some implementations, the server computer may further send information indicating that the first access data is invalid to a service provider computer, wherein the service provider computer invalidates use of the first access data.

In some embodiments, the server computer may utilize a session identifier. In some cases, the server computer may generate a session identifier that is unique to the user device and then send one or more message with the session identifier. The server computer may receive one or messages with the session identifier. The server computer may then determine that the one or more messages are associated with the user device based on the session identifier.

Embodiments of the invention are further directed to a server computer comprising a processor and a memory element. The memory element can comprise code, executable by the processor, for implementing any of the methods described herein.

These and other embodiments of the invention are described in further detail below.

DETAILED DESCRIPTION

Figure 1:
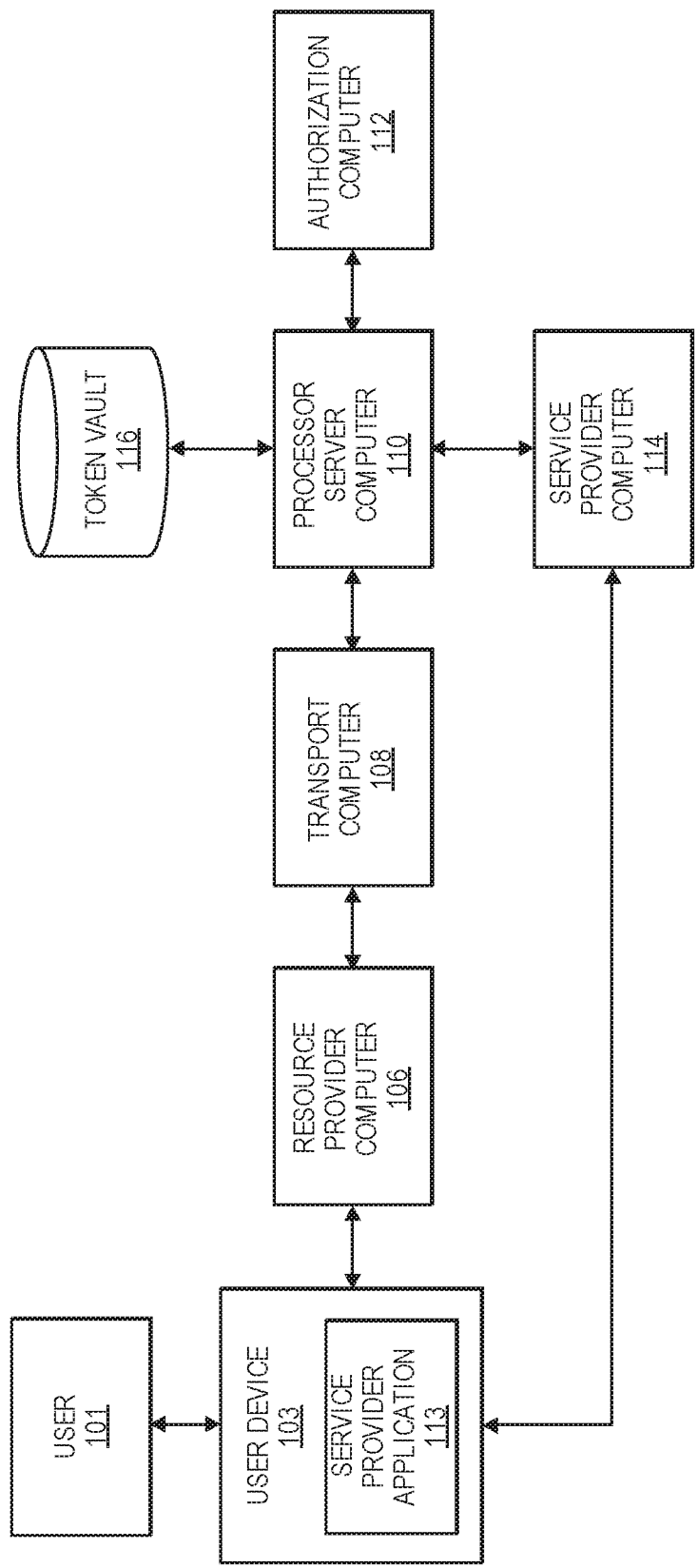
FIG. 1 shows an exemplary system according to embodiments of the present invention.

Embodiments of the invention relate to systems and methods for dealing with potentially compromised access data by utilizing a two-way compromise alert. A server computer may determine that access data associated with a user is potentially compromised. The server computer may then generate and send a compromise alert to a user device operated by the user to indicate that the access data is potentially compromised. The user can input a response to the compromise alert into their user device, the response indicating a request to issue new access data. The user device can send the response to the server computer, which may then immediately initiate generation of the new access data. The user can utilize the new access data to request access to a resource.

Embodiments of the invention reduce the time spent between detection of potentially compromised access data to the issuance of new access data for the user. For example, the process for issuing new access data for the user is efficient, since the user can quickly respond to a compromise alert received by their user device. Responding to the compromise alert with the user device can also enable personal information associated with the user and their user device to be utilized for authentication for issuing the new access data. This can forgo the user having to perform a typical cumbersome process of providing their authentication information orally over the phone or through a separate online or paper registration process.

Before discussing specific embodiments and examples, some descriptions of terms used herein are provided below.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "token" may include a substitute identifier for some information. In some embodiments, a token may be utilized in place of sensitive information (e.g., password, PIN, passcode, etc.). In some cases, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived.

An "authorization computer" can include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource.

"Access data" may refer to any suitable information that can be utilized to access a resource. Access data may include a secret, a password, a passcode, a PIN, a key, or other information that may be meant to be known to only a user and an entity hosting access to a resource. Access data may also include other non-secret information, such as a username, an email address, a shipping address, etc. In some cases, access data may include account information that can be utilized to access information associated with a user's account.

In some embodiments, the user's account may be a payment account. Examples of access data that may be utilized to access a user's payment account may include a PAN (Primary Account Number or "account number"), user name, expiration date, CVV (Card Verification Value), dCVV (Dynamic Card Verification Value), CVV2 (Card Verification Value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

"Contact information" may refer to any information that can be utilized to communicate with a user. For example, contact information may include an email address, a phone number, or other information. In some embodiments, contact information may also serve as access data of a user (e.g., email address may be a username of an account).

"Transaction data" (which may also be known as transaction information) may refer to any data or information surrounding or related to a transaction. For example, transaction data may include transaction details and any data associated with the transaction that may be utilized by entities involved in the transaction process. For instance, the transaction data may include information useful for processing and/or verifying the transaction. Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

A "resource providing entity" may be an entity that may make resources available to a user. Resource providing entities may also be known as resource providers. Examples of resource providing entities include merchants, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available resources that are physical items (e.g., goods, products, etc.) to the user. In other embodiments, resource providing entities may make available digital resources (e.g., electronic documents, electronic files, etc.) or services (e.g., digital wallet services) to the user. In some embodiments, resource providing entities may manage access to certain resources by the user.

A "server computer" can be a powerful computer or a cluster of computers. For example, the server computer can be a large mainframe, a minicomputer cluster, or a group of servers functioning as a unit. In one example, the server computer may be a database server coupled to a Web server.

FIG. 1 illustrates an exemplary system 100 with at least some of the components for implementing embodiments of the invention. FIG. 1 includes a user 101, a user device 103 operating a service provider application 113 hosted by a service provider computer 114, a resource provider computer 106, a transport computer 108, a processor server computer 110 in communication with a token vault 116, and an authorization computer 112. The computing devices (e.g., user device 103, resource provider computer 106, transport computer 108, processor server computer 110, authorization computer 112, and service provider computer 114) in FIG. 1 may be in communication with each other via any suitable communications networks.

The communications network may comprise a plurality of networks for secure communication of data and information between entities. In some embodiments, the communications network may follow a suitable communication protocol to generate one or more secure communication channels between user device 103 and processor server computer 110. A communication channel may in some instances comprise a "secure communication channel," which may be established in any known manner, including the use of mutual authentication and a session key and establishment of an SSL session. However, any method of creating a secure channel may be used. By establishing a secure channel, sensitive information related to user 101 may be securely transmitted to facilitate a transaction.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Any of the computing devices (e.g., user device 103, resource provider computer 106, transport computer 108, processor server computer 110, authorization computer 112, and service provider computer 114) may include a processor and a computer readable medium comprising code, executable by the processor for performing the functionality described herein.

A user 101 may be an entity operating user device 103. User 101 may be an individual or an entity represented by a group of individuals (e.g., corporation, etc.). User 101 may be associated with access data that can be utilized to request access to a resource. In some embodiments, user 101 may be associated with an account that can be accessed utilizing the access data. User 101 may be able to input information into user device 103 in response to received compromise alerts.

User device 103 may be any suitable computing device. User device 103 may include a memory that may store service provider application 113, which can be utilized to request access to a resource. User device 103 may be capable of communicating over a communications network with one or more entities, including service provider computer 114 and processor server computer 110. User device 103 may be utilized to remotely request access to a resource, such as through a website or service provider application 113. In some embodiments, user device 103 may also be utilized to request access to a resource by contact or contactless methods (e.g., NFC, Wi-Fi, Bluetooth, etc.) with an access device at a terminal. Some non-limiting examples of user device 103 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, cards (e.g., smart cards, magnetic stripe cards, etc.), and the like.

Service provider application 113 may provide a service accessible by user device 103. Service provider application 113 may be operated by service provider computer 114. In some embodiments, service provider application 113 may store information for an account associated with user 101. Service provider application 113 may be able to receive information input into user device 103 by user 101 and transmit it to other entities, such as service provider computer 114. In some cases, service provider application 113 may be a digital wallet application, a wallet provider application, a mobile wallet, or the like.

Service provider computer 114 may be a server computer that can send and receive messages to and from service provider application 113 on user device 103. Service provider computer 114 may maintain information associated with application use (e.g., past activity) for each user. In addition, service provider computer 114 may store information associated with a user's application account. In some cases, service provider computer 114 may be associated with an application provider that provides payment services. In such cases, service provider computer 114 may store information associated with a user's digital wallets.

Resource provider computer 106 may be associated with a resource provider and may be configured to process data associated with requests for access to a resource. In some embodiments, the data may include access data associated with a user that may be received from user device 103 or an access device in communication with user device 103. Resource provider computer 106 may engage in transactions or provide access to resources (e.g., goods, services, etc.) to consumers (e.g., user 101). In some embodiments, resource provider computer 106 may accept requests for access to a resource via a website or application. In some embodiments, resource provider computer 106 may be associated with a physical store that utilizes an access device for accepting in-person requests for access to a resource.

Transport computer 108 is typically a system for an entity (e.g., a bank) that has a relationship with a resource provider. Transport computer 108 may route messages for requesting access to a resource from resource provider computer 106 to authorization computer 112 via processor server computer 110. Some systems may be able to perform both authorization computer 112 and transport computer 108 functions. In some cases, transport computer 108 may also be known as an acquirer computer.

Processor server computer 110 may include data processing subsystems, networks, and operations. Processor server computer 110 may route information between entities, such as transport computer 108, authorization computer 112, and service provider computer 114. In some cases, processor server computer 110 may be utilized to support and deliver authorization services, as well as clearing and settlement services. In some embodiments, processor server computer 110 may be associated with a payment processing network (e.g., VisaNet® operated by Visa®), which may include wired or wireless network, including the Internet. In some embodiments, processor server computer 110 may provide token services and may be in communication with token vault 116.

Token vault 116 may comprise any information related to tokens. For example, token vault 116 may store tokens associated with service provider application 113 and a mapping of the tokens to their associated accounts. Token vault 116 may comprise any sensitive information (e.g., account number) associated with the tokens. In some embodiments, processor server computer 110 may communicate with token vault 116 to de-tokenize a token. In some cases, token vault 116 may reside at processor server computer 110.

Authorization computer 112 is typically a computer run by an entity (e.g., a bank) that may provide authorization services. Authorization computer 112 may be able to issue access data (e.g., passwords, account information, tokens, etc.) for a user. When a request for access is conducted utilizing access data issued by authorization computer 112, authorization computer 112 may verify the access data and respond with an authorization response message to transport computer 108 that may be forwarded to a corresponding access device, if applicable. In some embodiments, authorization computer 112 may communicate with processor server computer 110 to perform a tokenization process. In some embodiments, authorization computer 112 may host an application that runs on user device 103. In some embodiments, authorization computer 112 may also be known as an issuer computer.

At a later time (e.g., at the end of the day), a clearing and settlement process can occur between transport computer 108, processor server computer 110, and authorization computer 112.

Figure 2:
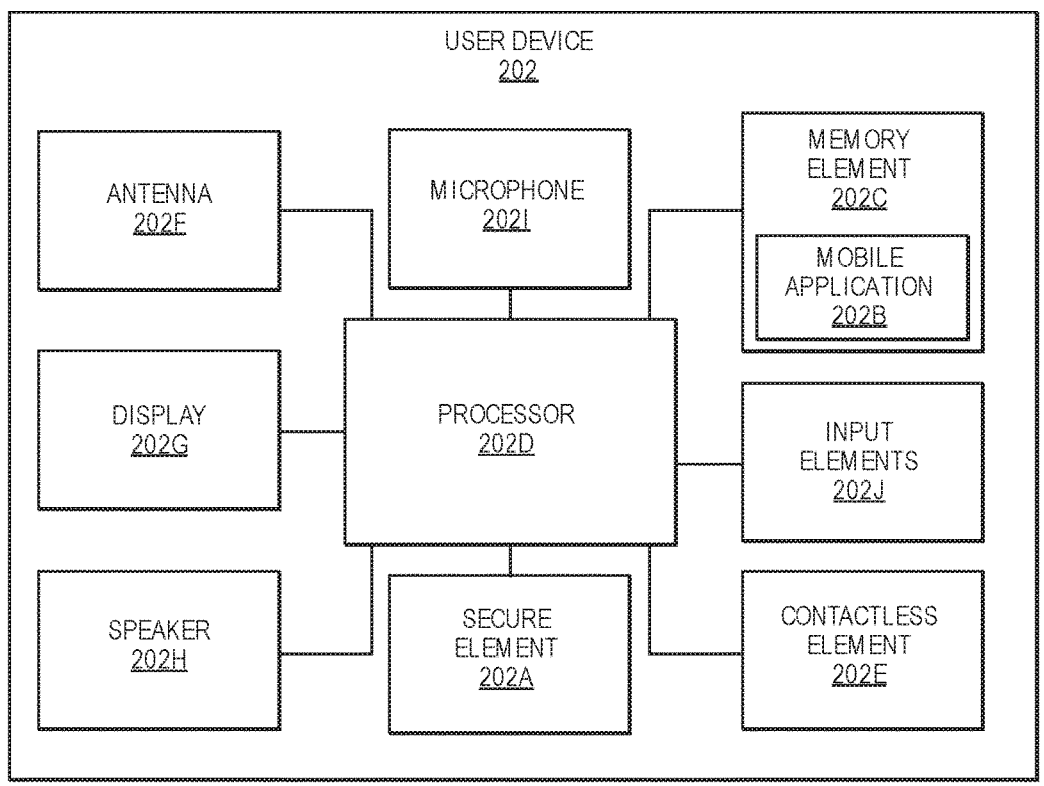
FIG. 2 shows a block diagram of an exemplary user device according to embodiments of the present invention.

FIG. 2 depicts a block diagram of an exemplary user device 202. FIG. 2 shows a number of components, and user device 202 according to embodiments of the invention may comprise any suitable combination or subset of such components.

User device 202 may include a processor 202D (e.g., a microprocessor) for processing functions of user device 202. One exemplary function enabled by processor 202D includes processing functions of display 202G to allow a user to see information (e.g., interfaces, contact information, messages, etc.). Processor 202D may include hardware within user device 202 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

User device 202 may comprise a secure element 202A. Secure element 202A may be a secure memory on user device 202 such that the data contained on secure element 202A cannot easily be hacked, cracked, or obtained by an unauthorized entity. Secure element 202A may be utilized by user device 202 to host and store data and applications that may require a high degree of security. Secure element 202A may be provided to user device 202 by a secure element issuer. Secure element 202A may be either embedded in the handset of user device 202 or in a subscriber identity module (SIM) card that may be removable from user device 202. Secure element 202A can also be included in an add-on device such as a micro-Secure Digital (micro-SD) card or other portable storage device.

Secure element 202A may store any suitable sensitive information. For example, secure element 202A may store access data (e.g., account information, token information, etc.) associated with a user. Other information that may be stored in secure element 202A may include user information or user data (e.g., name, date of birth, contact information, etc.). In other embodiments, some, none, or all of the foregoing information may be stored in memory element 202C or may be stored at a remote server computer (e.g., in the cloud).

User device 202 may comprise a memory element 202C (e.g., computer readable medium). Memory element 202C may be present within a body of user device 202 or may be detachable from the body of user device 202. The body of user device 202 may be in the form of a plastic substrate, housing, or other structure. Memory element 202C may store data (e.g., applications, etc.) and may be in any suitable form (e.g., a magnetic stripe, a memory chip, etc.).

Memory element 202C may comprise a mobile application 202B. Mobile application 202B may be computer code or other data stored on a computer readable medium (e.g. memory element 202C or secure element 202A) that may be executable by processor 202D to complete a task (e.g., provide a service). Mobile application 202B may be an application that operates on user device 202 and that may provide a user interface for user interaction (e.g., to enter and view information).

In some embodiments, mobile application 202B may be a service provider application (e.g., service provider application 113 of FIG. 1). Mobile application 202B may communicate with a service provider computer (e.g., service provider computer 114 of FIG. 1) to retrieve and return information during processing of any of a number of services offered to the user via user device 202 (e.g., providing access to a resource).

User device 202 may further include a contactless element 202E, which may typically be implemented in the form of a semiconductor chip (or other data storage element) with an associated wireless transfer (e.g., data transmission) element, such as an antenna 202F. Contactless element 202E may be associated with (e.g., embedded within) user device 202. Data or control instructions transmitted via a cellular network may be applied to contactless element 202E by means of a contactless element interface (not shown). In some cases, the contactless element interface may function to permit the exchange of data and/or control instructions between the user device circuitry (and hence the cellular network) and an optional contactless element 202E.

Contactless element 202E may be capable of transferring and receiving data using a near-field communications (NFC) capability (or NFC medium) typically in accordance with a standardized protocol or data transfer mechanism (e.g., ISO 14443/NFC). User device 202 may support contactless transactions using the EMV contactless communication protocol (EMV-CCP), which is based on ISO 14443, in order to interact with access devices. This capability may typically be met by implementing NFC. The NFC capability of user device 202 may be enabled by an embedded NFC chip or by the addition of an external memory card or accessory that contains the NFC chip. NFC capability is a short-range communications capability, such as RFID, Bluetooth™, infra-red, or other data transfer capability that can be used to exchange data between the user device 202 and an interrogation device. Thus, user device 202 may be capable of communicating and transferring data and/or control instructions via both cellular network and near-field communications capability.

User device 202 may further include an antenna 202F for wireless data transfer (e.g., data transmission). Antenna 202F may be utilized by user device 202 to send and receive wireless communications. Antenna 202F may assist in connectivity to the Internet or other communications networks and enable data transfer functions. Antenna 202F may enable SMS, USSD, as well as other types of cellular communications, such as voice call and data communications.

User device 202 may include a display 202G that may show information to a user. Display 202G may be any suitable screen that enables touch functionality. In some embodiments, display 202G of user device 202 may display a user interface (e.g., of a mobile application or website) that may allow the user to select and interact with objects presented on display 202G. The objects may include, but may not be limited to, menus, text fields, icons, and keys/inputs on a virtual keyboard.

User device 202 may include a speaker 202H, which may be any suitable device that can produce sound in response to an electrical audio signal. Speaker 202H may play recorded sounds, as well as prerecorded messages to communicate with a user. In some cases, the user may be able to receive instructions by voice communications played by speaker 202H to which the user may respond (e.g., by returning voice command, activating input elements, etc.).

User device 202 may include a microphone 202I, which may be any suitable device that can convert sound to an electrical signal. Microphone 202I may be utilized to capture one or more voice segments from a user. For example, microphone 202I may allow the user to transmit his or her voice to user device 202. In some embodiments, the user may utilize voice commands detected by microphone 202I to provide instructions to user device 202. In some cases, the user may provide voice commands detected by microphone 202I to navigate through mobile application 202B.

User device 202 may further include input elements 202J to allow a user to input information into the device. Example input elements 202J include hardware and software buttons, audio detection devices (e.g., microphone), biometric readers, touch screens, and the like. A user may activate one or more of input elements 202J, which may pass user information to user device 202. In some cases, one or more of input elements 202J may be utilized to navigate through various screens of mobile application 202B.

In some embodiments, where user device 202 is a phone or other similar computing device, user device 202 may include a browser stored in the memory element 202C and may be configured to retrieve, present, and send data across a communications network (e.g., the Internet). In such embodiments, user device 202 may be configured to send data as part of a transaction. In some embodiments, user device 202 may provide the data upon request from another entity (e.g., access device).

Figure 3:
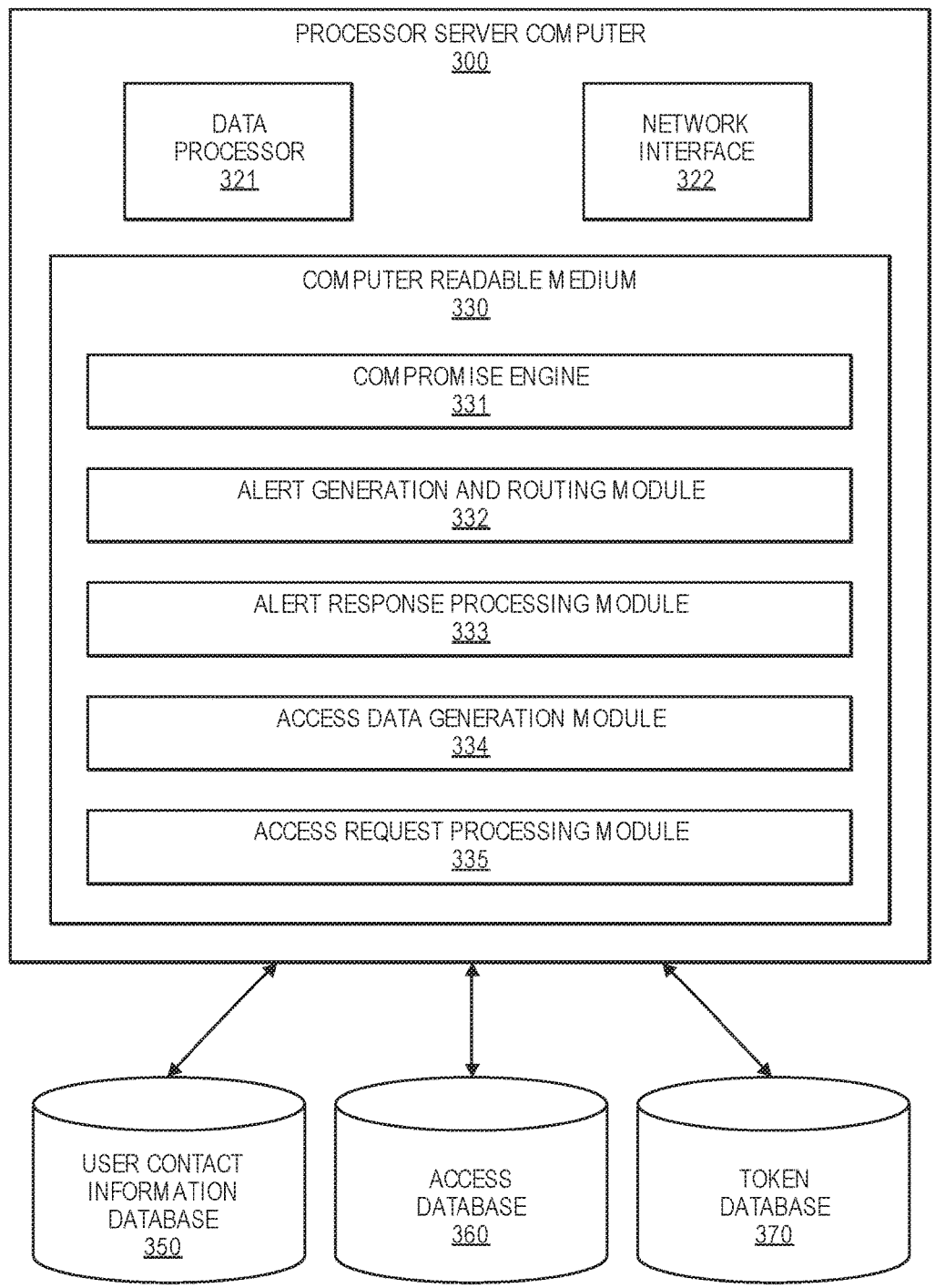
FIG. 3 shows a block diagram of an exemplary processor server computer according to embodiments of the present invention.

FIG. 3 depicts a block diagram of an exemplary processor server computer 300. FIG. 3 shows a number of components, and processor server computer 300 according to embodiments of the invention may comprise any suitable combination or subset of such components. Processor server computer 300 includes a data processor 321 for executing functions, a network interface 322 for communicating with other computing devices, and a computer readable medium 330 for storing data. The computer readable medium 330 may comprise a number of software modules including a compromise engine 331, an alert generation and routing module 332, an alert response processing module 333, an access data generation module 334, and an access request processing module 335. Each module may comprise one or more functions implemented by code, executable by data processor 321.

Other modules and submodules may also reside on computer readable medium 330. Examples of additional modules may include an authorization module for processing and routing authorization request and response messages, a clearing and settlement module for processing and routing clearing messages and performing settlement between parties, and data extraction (e.g., for retrieving data from external data sources such as databases) modules, storage modules, and message modification modules. Each module residing on computer readable medium 330 may be combined with any of the additional modules as appropriate. Any of the modules may comprise one or submodules, where each submodule may comprise one or more functions implemented by code, executable by data processor 321.

Processor server computer 300 may also be in communication with several databases, including a user contact information database 350, an access database 360, and a token database 370. Each database may be a conventional, fault tolerant, relational, scalable, secure database such as those commercially available from Oracle™ or Sybase™. In some embodiments, any of the databases may be combined into a single database, or may be separated into multiple databases. Processor server computer 300 may also be in communication with other databases that are not shown in FIG. 3.

Compromise engine 331 may enable, with data processor 321, determination of whether access data has been potentially compromised. Compromise engine 331 may analyze, in conjunction with data processor 321, information associated with a request for access utilizing access data against historical information associated with the access data. For example, compromise engine 331 may determine, with data processor 321, information stored in access database 360 associated with the access data and compare it against information associated with the received request. In some embodiments, compromise engine 331 may determine, with data processor 321, whether one or more pieces of information (e.g., time of request, location of request, resource requested, etc.) corresponding to the received request deviates to a certain degree from that indicated in the historical information. Upon determination that access data may be potentially compromised, compromise engine 331 may send, in conjunction with data processor 321, an instruction to alert generation and routing module 332 to generate a compromise alert.

Compromise engine 331 may utilize, with data processor 321, any suitable analysis techniques to determine whether access data has been potentially compromised. For example, compromise engine 331 may implement, with data processor 321, machine learning techniques to generate models that detect behavioral patterns in past requests for access that utilized the access data based on any number of features (e.g., time, location, requested resource, resource providing entity that is to provide the resource, device utilized to make request, etc.). Compromise engine 331 may utilize the models to determine, in conjunction with data processor 321, whether a request for access using the access data indicates potentially abnormal behavior.

Alert generation and routing module 332 may enable, with data processor 321, generation and transmission of compromise alerts. Alert generation and routing module 332 may generate, with data processor 321, the compromise alerts so that they indicate that a request was detected to be potentially compromised and that they include request details indicating information related to the request. For example, the request details may include information indicating a date, time, location, and a resource requested for access. In some cases, alert generation and routing module 332 may generate, with data processor 321, the compromise alerts so that they further include interactive interface elements that allow a user to select an option from a plurality of options. Alert generation and routing module 332 may determine, with data processor 321, contact information associated from user contact information database 350 and may transmit, in conjunction with data processor 321, generated compromise alerts to appropriate users based on the determined contact information.

In some embodiments, alert generation and routing module 332 may enable, with data processor 321, generation of compromise alerts based on certain format templates. For example, alert generation and routing module 332 may determine, with data processor 321, information associated with a format template from a database, where the information can indicate a format with which to generate a compromise alert. In some embodiments, the information may indicate text or image size, text or image alignment, text font, or other details that can show how the compromise alert should be generated. In some cases, alert generation and routing module 332 may determine, with data processor 321, that a user has specified a certain format template to follow for generating compromise alerts. In these cases, alert generation and routing module 332 may determine, with data processor 321, identifying information (e.g. a format template identifier) corresponding to the format template specified by the user and then determine, with data processor 321, information associated with the specified format template from a database based on the format template identifier. For example, alert generation and routing module 332 may query, with data processor 321, the database using the format template identifier, where the database can store information associated with a plurality of format templates that may each be mapped to a unique format template identifier.

In some embodiments, alert generation and routing module 332 may determine, with data processor 321, how to generate or transmit the compromise alerts based on configuration settings stored by processor server computer 300. For example, the configuration settings may indicate a format that the compromise alert should follow or a certain communication channel by which the compromise alert should be transmitted. It is understood that the configuration settings may be input by a user or set by processor server computer 300.

Alert response processing module 333 may enable, with data processor 321, processing of user responses to compromise alerts. Alert response processing module 333 may be able to determine, with data processor 321, appropriate actions to take based on what response it received for a compromise alert. In some embodiments, an appropriate action may be to follow up by sending another compromise alert. In this case, alert response processing module 33 may send, in conjunction with data processor 321, an instruction to alert generation and routing module 332 to generate another compromise alert. In other embodiments, an appropriate action may be to disable compromised access data and initiate generation of new access data. In this case, alert response processing module 33 may send, in conjunction with data processor 321, an instruction to access data generation module 334 to perform one or more of disable compromised access data or generate new access data. In some embodiments, alert response processing module 33 may determine, with data processor 321 and based on a response to a compromise alert, that access data is likely not compromised and can allow the request for access utilizing the access data to be fulfilled.

Access data generation module 334 may enable, with data processor 321, generation of new access data. In some embodiments, access data generation module 334 may generate, in conjunction with data processor 321, new access data that can be utilized to replace compromised access data. In some cases, the new access data may be configured to include the same types of information included in the compromise access data. For example, if the compromised access data included a username and password, the new access data may include a new user name and new password with similar formatting (e.g., follows same character type and length rules, etc.). In some embodiments, access data generation module 334 may generate, in conjunction with data processor 321, new access data including new account information. In some cases, the new account information (e.g., account identifier) may be associated with a new account of a user. In other embodiments, the new account information (e.g., token) may be associated with an existing account of a user. In some implementations, access data generation module 334 may send, in conjunction with data processor 321, a request to another entity (e.g., an authorization computer) to generate at least a portion of the new access data.

Access request processing module 335 may enable, in conjunction with data processor 321, any processing relating to requesting access to a resource. Access request processing module 335 may enable receiving, processing, and sending access request messages (e.g., authorization request messages), as well as any responses to access request messages (e.g., authorization response messages) received from other entities (e.g., an authorization computer). In some cases, access request processing module 335 may store, in conjunction with data processor 321, any information determined during processing of access requests in one or more databases, some of which may not be shown in FIG. 3, of processor server computer 300.

User contact information database 350 may comprise information related to contact information of users. In some embodiments, contact information may include one or more of a phone number, an email address, a shipping address, or an application identifier. In some cases, user contact information database 350 may also store information indicating a preference or a priority order of a communication channel by which a user should be contacted using their contact information.

Access database 360 may comprise information related to access requests. In some embodiments, access database 360 may include details (e.g., time of request, location of request, resource requested, etc.) associated with each received access request. In some cases, information stored in access database 360 may be organized based on the user or user device from which the access request originated. Access database 360 may be updated in real-time as access requests are received or periodically in batches.

Token database 370 may include any information related to tokens. For example, the information may include tokens (e.g., payment tokens), token identifiers, token expiry information, token status information, etc. In some embodiments, token database 370 may comprise data related to multiple user accounts. In such cases, token database 370 may store data organized by user account with each user account made differentiable by any suitable identifier. For each user account, token database 370 may store tokens and data related to the tokens associated with the user account.

Figure 4:
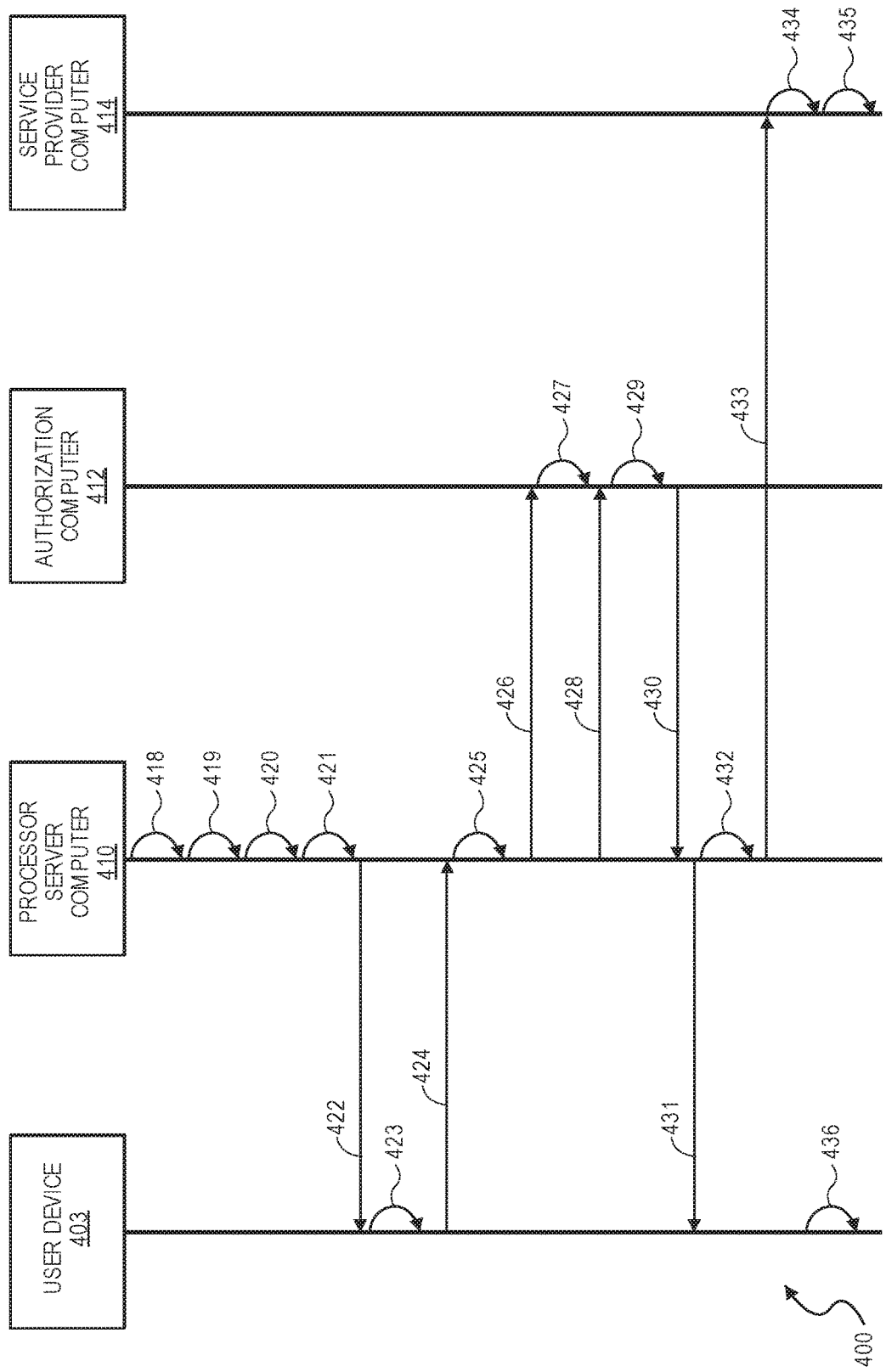
FIG. 4 shows a flow diagram of an exemplary method according to embodiments of the present invention.

A method according to embodiments of the invention can be described with respect to FIG. 4. FIG. 4 shows an exemplary flow diagram 400 of a method for issuing access data in response to a compromise alert according to embodiments of the present invention. FIG. 4 includes a user device 403 operated by a user, a processor server computer 410, an authorization computer 412, and a service provider computer 414.

At step 418, processor server computer 410 may receive information indicating that a request for access to a resource was initiated using the first access data. The information may indicate any suitable background data regarding the request for access to the resource. For example, the information may indicate the time that the request was made, location that the request was made, the requested resource, the resource providing entity that is to provide the resource, or the device that was utilized to make request.

The first access data may be associated with the user operating user device 403 and may be utilized to request access to the resource. For example, the first access data may include a username, password, secret, passcode, a PIN, key, or other information. In an exemplary case, the first access data may be associated with an account of the user, where the first access data can be utilized to request access to the account.

At step 419, processor server computer 410 may detect that the first access data has been potentially compromised. In some embodiments, processor server computer 410 may determine whether the first access data has been potentially compromised based on analyzing the received information regarding the request for access to the resource. For example, processor server computer 410 may compare the received information against stored information related to past requests for access to the resource. Processor server computer 410 may then determine that the first access data is potentially compromised if the information does not match to a certain degree (e.g., 100%, 90%, etc.). Any information utilized to perform the analysis may be accessible by a database residing at processor server computer 41 or otherwise be in communication with processor server computer 410 (e.g., via another entity).

It is understood that processor server computer 410 may utilize any suitable analysis techniques to determine whether the first access data has been potentially compromised. For example, processor server computer 410 may implement machine learning techniques to generate models that detect behavioral patterns in past requests for access that utilized the first access data based on any number of features (e.g., time, location, requested resource, resource providing entity that is to provide the resource, device utilized to make request, etc.). The models may be utilized to determine whether a request for access using the first access data indicates potentially abnormal behavior.

At step 420, processor server computer 410 may determine contact information of the user associated with the first access data. The contact information may include any suitable information that can be utilized to communicate with the user through their user device 403. For example, the contact information may include a phone number, an email address, or an application identifier. Processor server computer 410 may retrieve the contact information of the user associated with the first access data by a database residing at processor server computer 410 or otherwise be in communication with processor server computer 410 (e.g., via another entity).

At step 421, processor server computer 410 may generate a compromise alert. The compromise alert may indicate that there is a potential compromise of the first access data using any suitable combination of text, images, pictures, video clips, or audio clips. The compromise alert may be in any suitable form, such as a text message, an email message, an in-app notification, or other form. The compromise alert may be made up of one or more parts (e.g., multiple messages). Exemplary compromise alerts are described in further detail with respect to FIGS. 7-10.

In some embodiments, the compromise alert may be configured so that it is interactive. For example, the compromise alert may be configured so that the user can be prompted for information and the user can interact with the compromise alert to input a response. In exemplary flow 400, the compromise alert may be configured so that the user is prompted regarding the request for access to the resource detected in step 418. The compromise alert may show the user information surrounding the request (e.g., time, location, requested resource, etc.) and prompt the user to confirm whether the request is valid.

At step 422, processor server computer 410 may send the compromise alert to user device 403. Processor server computer 410 may send the compromise alert using a suitable communication channel (e.g., text, email, in-app notification, etc.) corresponding to the contact information determined at step 420.

At step 423, user device 403 may receive a response to the compromise alert input by the user. In some embodiments, the user may respond to the compromise alert by selecting an option from a plurality of options indicated by the compromise alert. The user may indicate a selection by activating interface elements (e.g., buttons, checkboxes, switches, sliders, etc.) of the compromise alert, typing their response into a text field, inputting an audio command, or by other suitable method.

At step 424, user device 403 may send the response input by the user to processor server computer 410. User device 403 may send the response to processor server computer 410 by any suitable communication channel, which may or may not be the same type of communication channel as that utilized to send the compromise alert to user device 403 in step 422. In some embodiments, user device 403 may send identification information associated with the user or user device 403 along with the response, so that processor server computer or authorization computer 412 may utilize the identification information to authenticate the user. The identification information may include any suitable information unique to the user or user device 403, such as a name, a device identifier, a network identifier, an IP address, or any combination of identification information that may be encrypted with a key associated with user device 403.

At step 425, processor server computer 410 may process the response received from user device 403. Processor server computer 410 may determine an action to take based on processing the response. In some implementations, processor server computer 410 may determine information from a lookup table comprising a mapping between various types of responses from the user and corresponding actions that processor server computer 410 can perform. In some embodiments, the response may indicate that the user confirms that the request for access to the resource received at step 418 is valid. In such cases, while not shown explicitly in flow 400, processor server computer 410 may determine (e.g., based on information in the lookup table) that the first access data is not compromised and that new access data does not need to be issued. In other embodiments, the response may indicate that the user indicates that the request for access to the resource received at step 418 is invalid. In such cases, processor server computer 410 may determine (e.g., based on information in the lookup table) that the appropriate action to take is to initiate generation of second access data for the user.

In some embodiments, processor server computer 410 may conduct an authentication process before initiating generation of the second access data for the user. As described with respect to step 424, processor server computer 410 may receive identification information associated with the user or user device 403. Processor server computer 410 may utilize the received identification information to determine whether to authenticate the user. If the user cannot be authenticated, processor server computer 410 may terminate performing further steps in flow 400. If the user can be authenticated, processor server computer 410 may determine that the request to disable use of the first access data is valid and subsequently proceed with performing step 426. Processor server computer 410 may process the identification information during the authentication process in various ways.

In some cases, processor server computer 410 may compare at least a portion of the identification information with previously enrolled information. For example, processor server computer 410 may have access to information specific to the user or user device 403 (e.g., name, device identifier, location identifier, etc.) that was stored during a previous enrollment process and can compare it with the identification information received at step 424. Processor server computer 410 may determine that the user is authenticated if the previously stored identification and the received identification information match to a certain degree (e.g., full match, match to a threshold level, etc.).

In some cases, processor server computer 410 may, instead of or in addition to comparing previously stored identification with the received identification information, authenticate the user based on secret information known by user device 403 and processor server computer 410. In some embodiments, during a previous enrollment process, user device 403 and processor server computer 410 may correspond in order to determine an algorithm for determining the secret information. For example, user device 403 and processor server computer 410 may determine that the secret information can be generated using one or more specific pieces of identification information as inputs and performing a series of operations on the inputs. The series of operations may include any suitable combination of one or more operations (e.g., concatenation, bit-wise operations, encryption or decryption using a key associated with user device 403, etc.) in a specific order.

In cases in which processor server computer 410 performs an authentication process based on the secret information, processor server computer 410 may receive the secret information with the identification information received from user device 403 at step 424. Processor server computer 410 may then generate the secret information independently based on the pre-determined algorithm and compare it with the secret information included in the identification information received from user device 403. If the independently generated secret information matches that received from user device 403, processor server computer 410 may determine that the user is authenticated.

In some embodiments, processing the response at step 425 may also comprise generating a session identifier. In some embodiments, the session identifier may be any suitable value that can be utilized to uniquely identify communications between user device 403 and processor server computer 410 in flow 400. For example, the session identifier may be generated based on any suitable combination of information, such as one or more timestamps (e.g., timestamp corresponding to response received at step 424), the user's response at step 424, identification information associated with user device 403 (e.g., device ID, IP address, application identifier, etc.), identification information associated with processor server computer 410, a counter value, one or more random values, or other information.

In some cases, processor server computer 410 may associate any messages transmitted in at least steps 426 through 430 with the session identifier. This can ensure that processor server computer 410 can track the messages based on a common value. In some cases, processor server computer 410 may include the session identifier in the messages (e.g., in a data field, header, etc.) while in other cases, each of the messages can be transmitted along with the session identifier.

In some embodiments, upon generating the session identifier, processor server computer 410 may also associate the session identifier with contact information associated with the user. The contact information may be that determined by processor server computer 410 in step 420. This can ensure that processor server computer 410 can later recognize the contact information that may be utilized to send access data to user device 403 at step 431 based on receiving a message associated with the same session identifier at step 430.

In some implementations, steps 421 through 425 may include more steps than those shown in flow 400. For example, based on processing a first response from user device 403, processor server computer 410 may generate a second compromise alert, which may be sent to user device 403. User device 403 may then receive a second response input by the user and send the second response to processor server computer 410. Processor server computer 410 may then process the second response to determine a next action to take based on the second response. It is understood that not all compromise alerts received by user device 403 may prompt the user for information. For example, in some cases, the second compromise alert may not prompt the user for a response but may instead display information to the user. Any suitable number of compromise alerts and responses may be sent between user device 403 and processor server computer 410. Some exemplary compromise alerts of different styles and types are shown in FIGS. 7-10.

Figure 7:
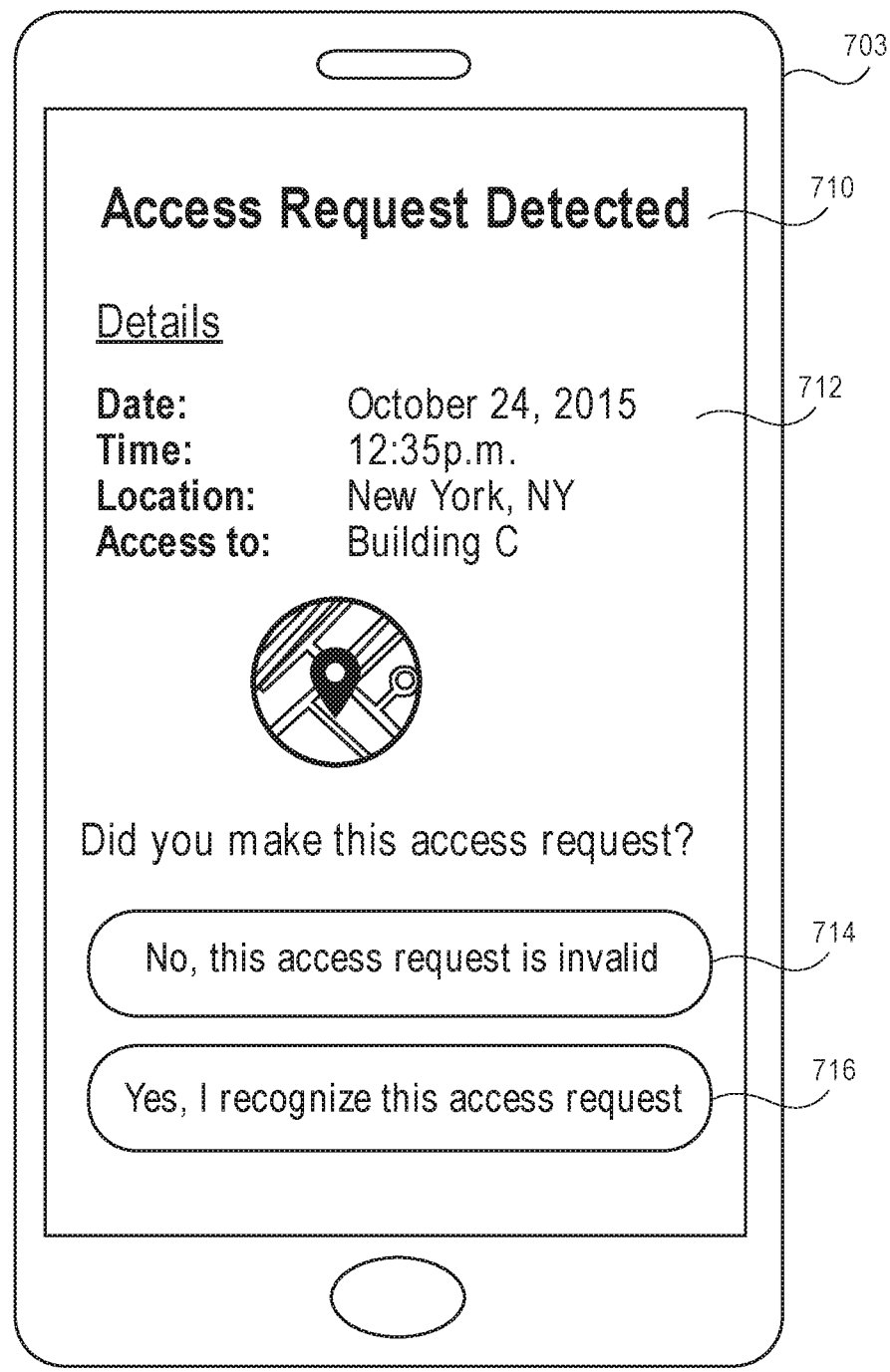
FIG. 7 shows an exemplary compromise alert received by a user device according to embodiments of the present invention.

FIG. 7 shows an exemplary compromise alert 710 received by a user device 703 operated by a user according to embodiments of the invention. Compromise alert 710 may be viewed in an application, a web browser, a pop-up message, or other suitable mechanism. Compromise alert 710 may include request details 712, which may indicate any information related to a detected access request. For example, request details 712 may include information indicating a date, time, location, and a resource requested for access. Compromise alert 710 may further include interactive interface elements 714 and 716. In one exemplary case, the user may activate interface element 714 to indicate that they do not recognize the access request indicated by request details 712. This response may confirm that the access data utilized for the access request may be compromised. In another exemplary case, the user may activate user interface element 716 to indicate that they recognize the access request indicated by request details 712. This response may confirm that the access data utilized for the access request is likely not compromised. User device 703 may send information indicating the user's response to a processor server computer, which may subsequently process the response.

Figure 8:
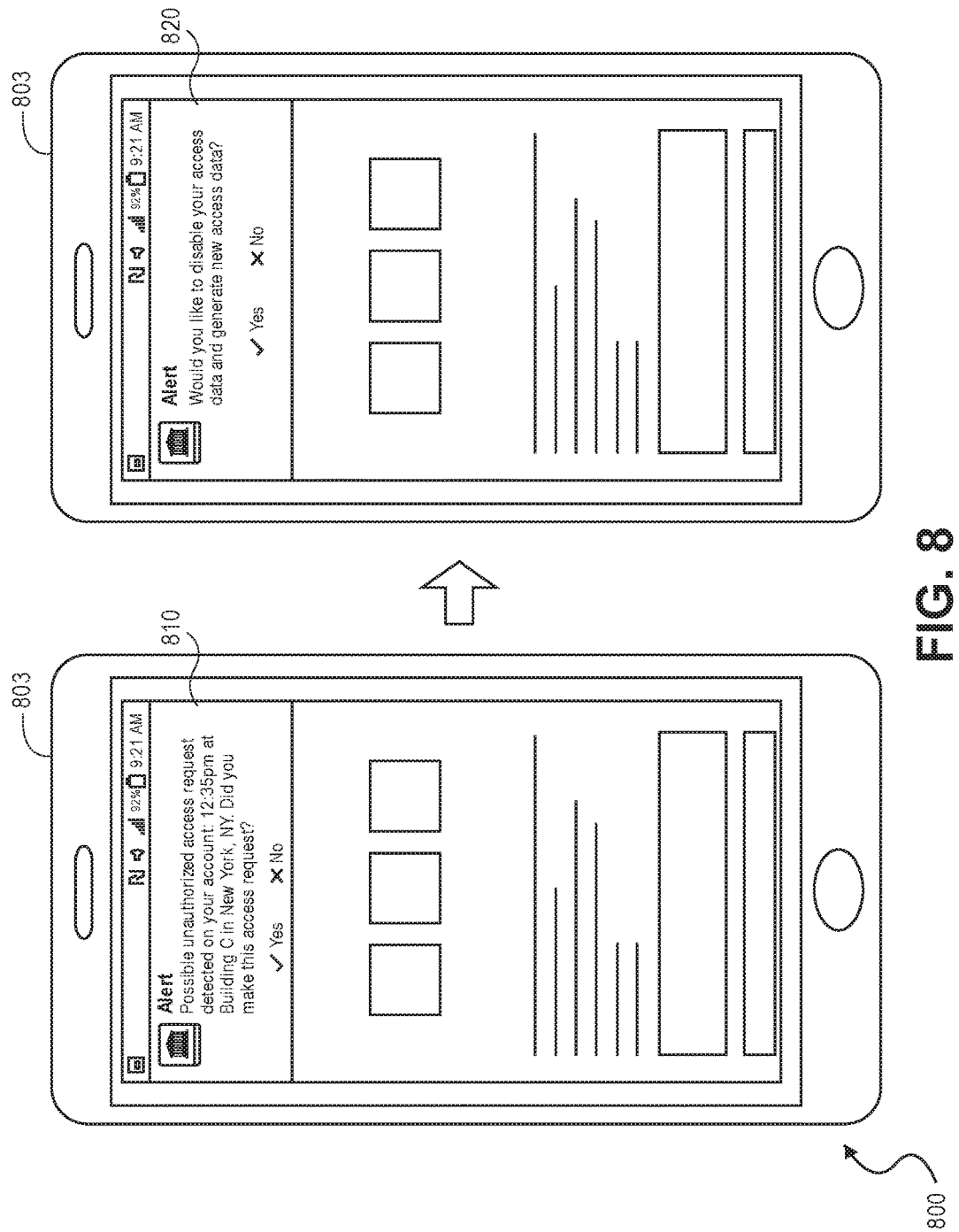
FIG. 8 shows exemplary compromise alerts received by a user device according to embodiments of the present invention.

FIG. 8 shows a flow 800 depicting a user device 803 operated by a user and that receives exemplary compromise alerts 810 and 820 according to embodiments of the invention. Compromise alerts 810 and 820 may be delivered as banner-style in-app notifications and may both comprise interactive interface elements (e.g., Yes/No buttons). Compromise alert 810 may include request details associated with an access request. The request details may include information indicating a date, time, location, and a resource requested for access. The user may activate either the "Yes" or "No" button of compromise alert 810 to indicate whether they recognize the access request. In flow 800, the user may indicate that they do not recognize the access request indicated by compromise alert 810. For example, the user may activate the "No" button in response to the prompted information. User device 703 may send information indicating the user's response to a processor server computer, which may subsequently process the response.

In some embodiments, user device 803 may subsequently receive compromise alert 820. Compromise alert 820 may prompt the user for additional information. For example, compromise alert 820 may prompt the user regarding whether they would like to disable the access data utilized for the access request indicated by compromise alert 810 and generate new access data. The user may activate either the "Yes" or "No" button of compromise alert 820 to indicate their response, which user device 803 may send to the processor server computer. It is understood that in other embodiments, the generation of the new access data may be performed automatically upon the user responding to compromise alert 810, and thus the user may not receive compromise alert 820.

Figure 9:
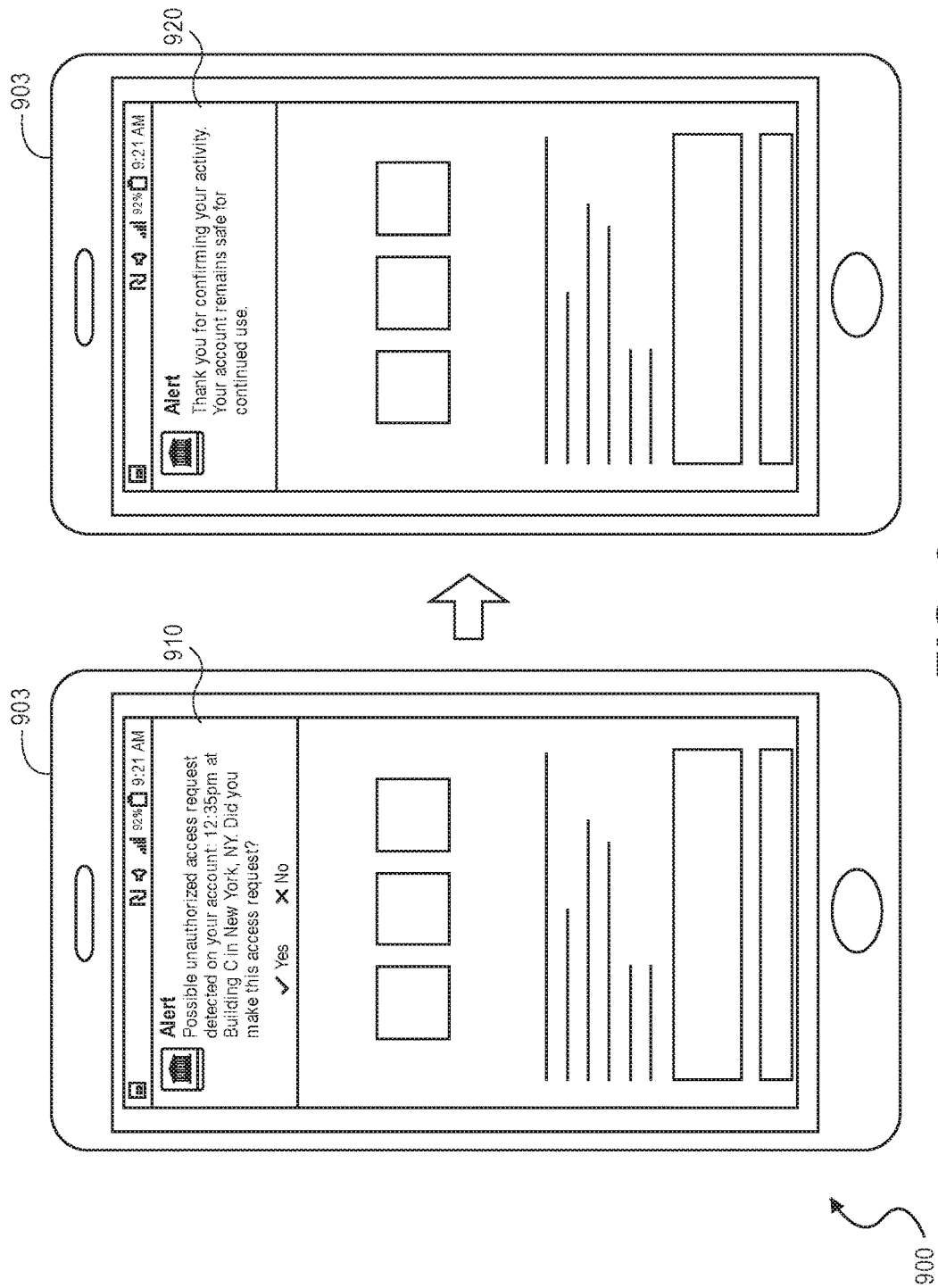
FIG. 9 shows exemplary compromise alerts received by a user device according to embodiments of the present invention.

FIG. 9 shows a flow 900 depicting a user device 903 operated by a user and that receives exemplary compromise alerts 910 and 920 according to embodiments of the invention. Compromise alert 910 may include the same information as that of compromise alert 810 shown in FIG. 8. Thus, similar to the process described in flow 800 with respect to compromise alert 810, the user may respond to compromise alert 910 to specify whether they believe that the access request indicated by compromise alert 910 is valid. In flow 900, the user may indicate that they recognize the access request indicated by compromise alert 910. For example, the user may activate the "Yes" button in response to the prompted information. User device 703 may send information indicating the user's response to a processor server computer, which may subsequently process the response. In some embodiments, user device 903 may receive a follow up comprise alert 920 that includes a confirmation that the user's response was received and that the access request was determined to be valid.

Figure 10:
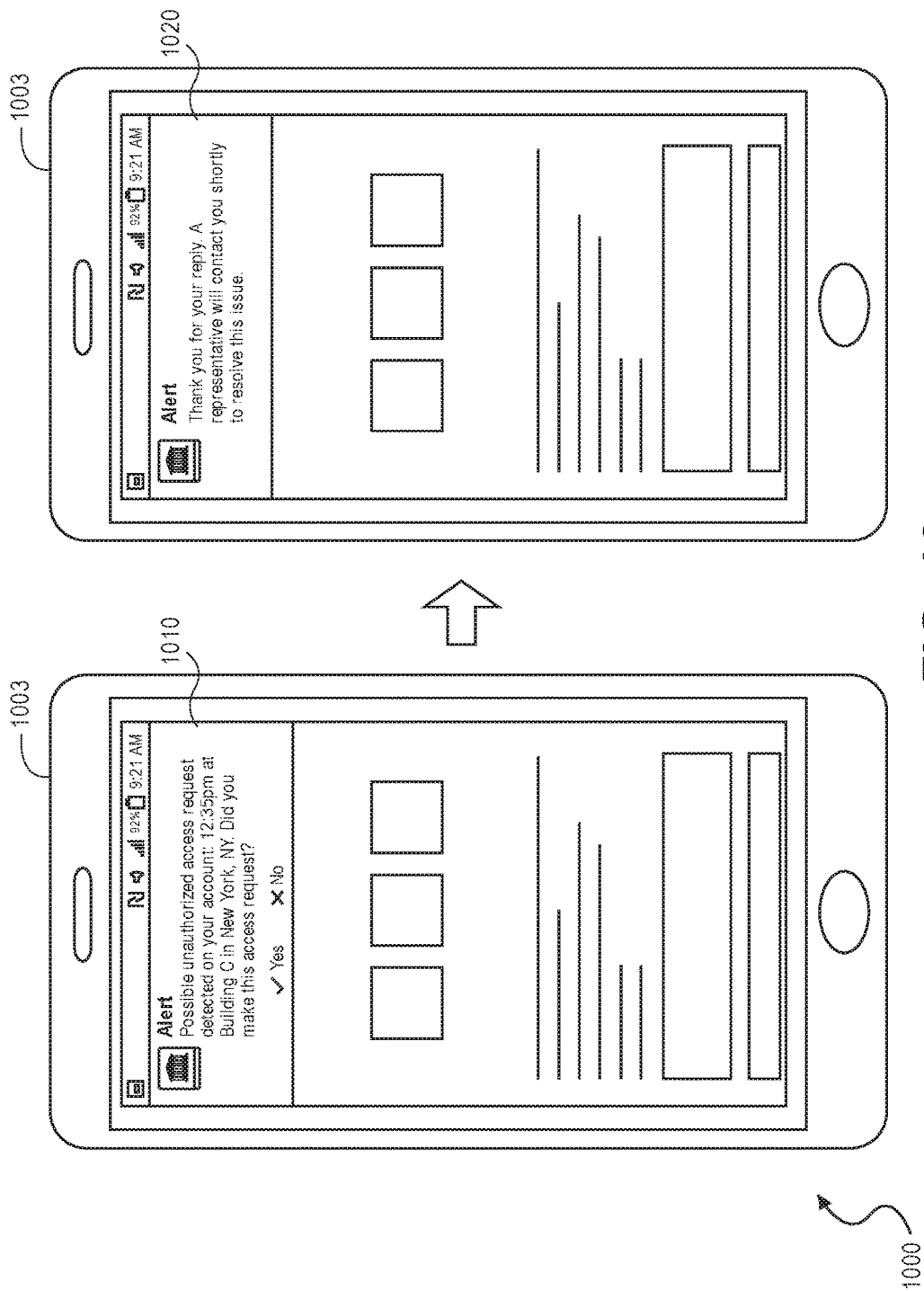
FIG. 10 shows exemplary compromise alerts received by a user device according to embodiments of the present invention.

FIG. 10 shows a flow 1000 depicting a user device depicting a user device 1003 operated by a user and that receives exemplary compromise alerts 1010 and 1020 according to embodiments of the invention. Compromise alert 1010 may include the same information as that of compromise alert 810 shown in FIG. 8. Thus, similar to the process described in flow 800 with respect to compromise alert 810, the user may respond to compromise alert 1010 to specify whether they believe that the access request indicated by compromise alert 1010 is valid. In flow 1000, the user may indicate that they do not recognize the access request indicated by compromise alert 1010. For example, the user may activate the "No" button in response to the prompted information. User device 1003 may send information indicating the user's response to a processor server computer, which may subsequently process the response.

In some embodiments, user device 1003 may subsequently receive compromise alert 1020. Compromise alert 1020 may include a confirmation that the user's response was received and that a representative will contact (e.g., call) the user to resolve the issue. Accordingly, upon processing the response to compromise alert 1010 input by the user, the processor server computer may forward the user's contact information (e.g., phone number) to the representative. This can enable the representative and the user to resolve an issue with potentially compromised access data over phone conversation. It is understood that in other embodiments, the generation of the new access data may be performed automatically upon the user responding to compromise alert 1010, and thus the user may not receive compromise alert 1020 or a call from the representative.

As described with respect to FIGS. 7-10, the compromise alerts sent to the user can take different formats and include various types of information. FIGS. 7-10 are no meant to be limiting and simply show exemplary compromise alerts according to embodiments of the invention. Any suitable compromise alerts and responses to compromise alerts can be configured between user device 403 and processor server computer 410.

Referring back to FIG. 4, the response received from user device 403 in step 424 of flow 400 may indicate that the user believes that the access request indicated in step 418 is invalid. Accordingly, processor server computer 410 may initiate generation of second access data for the user, so that the user can utilize the second access data to request access to the resource.

At step 426, processor server computer 410 may send a request to disable use of the first access data to authorization computer 412. The request may be sent with the first access data. In some embodiments, processor server computer 410 may send the result of the authentication process performed at step 425 with the request to indicate to authorization computer 412 that the user was authenticated and that the request to disable use of the first access data. Since this cancellation process can be conducted immediately after the user inputs a response to the alert received by user device 403, the chance for the compromised first access data to be utilized for further fraud is reduced. In an exemplary case, the first access data may be associated with an account of the user and the request to disable use of the first access data may be a request to disable use of the account associated with the user.

At step 427, authorization computer 412 may disable use of the first access data. In some cases, authorization computer 412 may check that the user was authenticated by processor server computer 410 before proceeding to disable use of the first access data. In some embodiments, authorization computer 412 may disable use of the first access data by deleting the first access data and any related information from its systems. In other embodiments, authorization computer 412 may disable use of the first access data by storing an indication (e.g., flag, blacklist entry, hold, etc.) that the use of the first access data is disabled along with other relevant data (e.g., time or date that the first access data was disabled, etc.).

At step 428, processor server computer 410 may send a request to issue second access data to authorization computer 412. In an exemplary case, the first access data may be associated with an account of the user and the request to issue the second access data may be a request to issue a new account for the user. It is understood that in some cases, steps 426 and 428 can be combined so that the request to disable use of the first access data and the request to issue the second access data are sent using one message.

At step 429, authorization computer 412 may generate the second access data. Typically, the second access data may be configured so that it can replace the first access data. In some embodiments, the second access data and the first access data may include the same types of information so that the second access data can be utilized in a manner similar to how the user utilized the first access data. For example, if the first access data included a user identifier and a PIN, the second access data may include a newly generated user identifier and PIN that differ from that of the first access data. Further, if the user previously utilized the first access data to access a resource, the second access data may be configured (e.g., formatted) to enable the user to access to the same resource or another resource of the same type.

At step 430, authorization computer 412 may send the second access data to processor server computer 410. While not required, in some embodiments, authorization computer 412 may obfuscate the second access data prior to sending the second access data. For example, authorization computer 412 may encrypt the second access data with a secret key known to processor server computer 410 and authorization computer 412. This may ensure that an intermediary that intercepts communications between authorization computer 412 and processor server computer 410 cannot obtain the second access data, which can include sensitive information.

While not required, any communications between processor server computer 410 and authorization computer 412 may be digitally signed. For example, processor server computer 410 may digitally sign messages sent to authorization computer 412 (e.g., at step 426 and 428), so that authorization computer 412 can verify the digital signature upon receipt of the messages. Additionally, authorization computer 412 may digitally sign messages sent to processor server computer 410 (e.g., at step 430), so that processor server computer 410 can verify the digital signature upon receipt of the messages. A valid digital signature can indicate to the recipient that the sender and the message are authentic.

At step 431, user device 403 may receive the second access data from processor server computer 410. This may allow the user to obtain the second access data that can be utilized to request access to the resource. In some embodiments, the user may provide the second access data to a service provider application running on user device 403. The application may be hosted by service provider computer 414, which may then store the received second access data input by the user. In some embodiments, service provider computer 414 may request the user for authentication information (e.g., password, PIN, biometric information, etc.) before storing the received second access data. Upon storage of the second access data by service provider computer 414, the user may then utilize the application to request access to the resource utilizing the second access data. While not explicitly shown in flow 400, in some cases, authorization computer 412 may transmit the second access data to user device 403.

In other embodiments, the user may not manually input the second access data into user device 403. Instead, processor server computer 410 may automatically communicate with service provider computer 414 to communicate the second access data upon receipt as described with respect to steps 432 to 435.

At step 432, processor server computer 410 may process the second access data. In some cases, processor server computer 410 may store the second access data along with any relevant information associated with the second access data (e.g., date and time of receipt, etc.) and proceed to step 432. In other embodiments, processor server computer 410 may in addition modify the second access data prior to sending it to service provider computer 414. For example, processor server computer 410 may generate a token associated with the second access data and may replace sensitive information with the token. The token may include substitute information that can be formatted similarly to the replaced information. Processor server computer 410 may store information indicating a mapping between the replaced sensitive information and the token in a database.

At step 433, processor server computer 410 may transmit the second access data to service provider computer 414. In some embodiments, the transmitted second access data may be unmodified from that received by processor server computer 410 in step 430. In other embodiments, the transmitted second access data may be that modified by processor server computer 410 at step 431. For example, the transmitted second access data can include the token generated by processor server computer 410 in place of certain sensitive information. While not required, utilization of tokenization techniques can increase security, since a token is simply substitute information and cannot be utilized to conduct valid requests for access. Accordingly, an intermediary entity that may intercept the token cannot utilize it to perform fraudulent actions.

At step 434, service provider computer 414 may store the second access data. In some embodiments, the second access data may be stored in association with the user information corresponding to the user, where the user information may have been previously stored by service provider computer 404 during an enrollment process to set up the service provider application on user device 403. As a result, the second access data may be provisioned to service provider computer 214 and may be accessible by the user through their service provider application running on user device 403.

At step 435, service provider computer 414 may perform an authentication process. In some embodiments, the authentication process may comprise service provider computer 214 requesting the user to enter login credentials (e.g., username and password, biometric information, etc.) through the service provider application on user device 403 and then validating the entered credentials against information stored in its systems. In other embodiments, the authentication process can be conducted without requesting input from the user. For example, service provider computer 414 may obtain information from user device 403 (e.g., device identifier, etc.) and check whether it matches information already stored in its systems during a previous enrollment process.

At step 436, the user may utilize the newly provisioned second access data on user device 403. For example, the user may access their service provider application on user device 403 and input a request to access the resource utilizing the second access data. User device 403 may send the request to access the resource with the second access data to one or more request processing entities (e.g., processor server computer, transport computer, authorization computer, service provider computer, etc.), which can process the request. It is understood that if processor server computer 410 receives a request to access the resource and determines that the request for access to the resource was initiated utilizing the first access data, processor server computer 410 may decline the request for access to the resource.

It is understood that embodiments of the invention enable steps 425 to 435 to be performed automatically without further input from the user, which increases efficiency compared to conventional processes. For example, the time taken between receiving a response to the compromise alert at step 424 to providing the second access data to user device 403 may be short (e.g., within 30 seconds). This is in contrast to traditional processes that would take much longer (e.g., hours, days, etc.) for a user to be issued new access data based on a phone conversation and/or mailing of information to a shipping address. Additionally, embodiments of the invention enable automatic updating of access data for a service provider application in steps 432 to 435, which is also efficient compared to conventional processes. For example, conventional processes may involve the user waiting to receive new access data, identifying the new access data, and inputting the new access data into an interface during a registration process.

An exemplary use case of flow 400 is described below in which the resource to which the user requests access is account information associated with the user. The user may have set up an original account during a previously conducted enrollment process. In this exemplary case, first access data may include account information corresponding to the original account associated with the user and second access data may include new account information corresponding to a new account associated with the user. In this exemplary case, account information may be a financial account that can be utilized to conduct payment transactions.

Processor server computer 410 may detect that a potentially compromised request for access was initiated utilizing account information associated with the account. The account information may include any information that may be utilized to conduct payment transactions, such as an account number, an expiration date, and a verification value. In some cases, processor server computer 410 may analyze the request for access and determine that it does not follow expected behavior of the user based on a combination of characteristics associated with the request (e.g., location, time, day of week, etc.). Processor server computer 410 may then determine contact information of the user (e.g., phone number) in preparation to send a compromise alert to user device 403 operated by the user. Processor server computer 410 may then generate the compromise alert indicating the potentially compromised request and send the compromise alert to user device 403 (e.g., over text message). The user may receive the compromise alert, which can prompt the user regarding whether the request for access was valid.

The user may send a response indicating that they do not recognize the request for access indicated in the compromise alert, which may cause processor server computer 410 to initiate generation of new account information for a new account for the user. Processor server computer 410 may then communicate with authorization computer 412 to disable use of the account information associated with the original account of the user and subsequently generate the new account information for the new account associated with the user. The new account information may include new information that may be utilized to conduct payment transactions, such as a new account number, a new expiration date, and a new verification value.

In some embodiments, processor server computer 410 may perform a tokenization process to tokenize the account number of the new account information. For example, processor server computer 410 may generate a substitute 16-digit value to be utilized in place of the account number by service provider computer 414. Processor server computer 410 may communicate with service provider computer 414 to provision the token to user device 403, so that the user is able to utilize the token to conduct transactions with the new account.

At a later time, the user may conduct a transaction utilizing the new account information. The user may input the request into the service provider application running on user device 403, which may send the request along with the new account information to a resource provider computer associated with a resource provider (e.g., merchant). The request with the new account information may be sent to processor server computer 410 (e.g., via a transport computer), which can process the request.

If the new account information includes a token instead of an account number, processor server computer 410 may de-tokenize the token. Processor server computer 410 may perform the de-tokenization process by accessing a token vault storing information indicating a mapping between account information and tokenized account information of accounts. Based on the information indicated by the mapping, processor server computer 410 may determine that the token is associated with account information corresponding to the user's new account. The account information may include an account identifier (e.g., account number) or other information that may be relevant to conducting a transfer of funds (e.g., verification values, etc.). Processor server computer 410 may then send authorization computer 412 the account identifier instead of the token to process the transaction request. Authorization computer 412 may utilize the account identifier to recognize that the user is utilizing their new account to conduct the transaction. Upon authorization by authorization computer 412, the transaction may be completed.

It is understood that the user may utilize their new account for any suitable type of transaction. For example, the user may pay for a transaction using their new account by a contactless transaction with an access device at a resource provider computer. Additionally, the user may pay for an e-commerce transaction using their new account. Hence, user device 403 may be any suitable device that may be capable of conducting in-person or remote transactions. Some exemplary payment methods may include eCommerce (electronic commerce), mCommerce (mobile commerce), In-app (purchases from within an application), NFC (near field communication), MST (Magnetic Secure Transmission™).

It is understood that in some embodiments, embodiments of the invention can be implemented such that the processor server computer disables first access data and issues second access data instead of the authorization computer. For example, instead of the authorization computer disabling an original account and issuing a new account as in the exemplary case described above, embodiments of the invention can be implemented by the processor server computer disabling an original token associated with the user and issuing a new token for the user. Both tokens may correspond to the user's existing account, which forgoes the need to issue a new account. A method according to this implementation is described with respect to FIG. 5.

Figure 5:
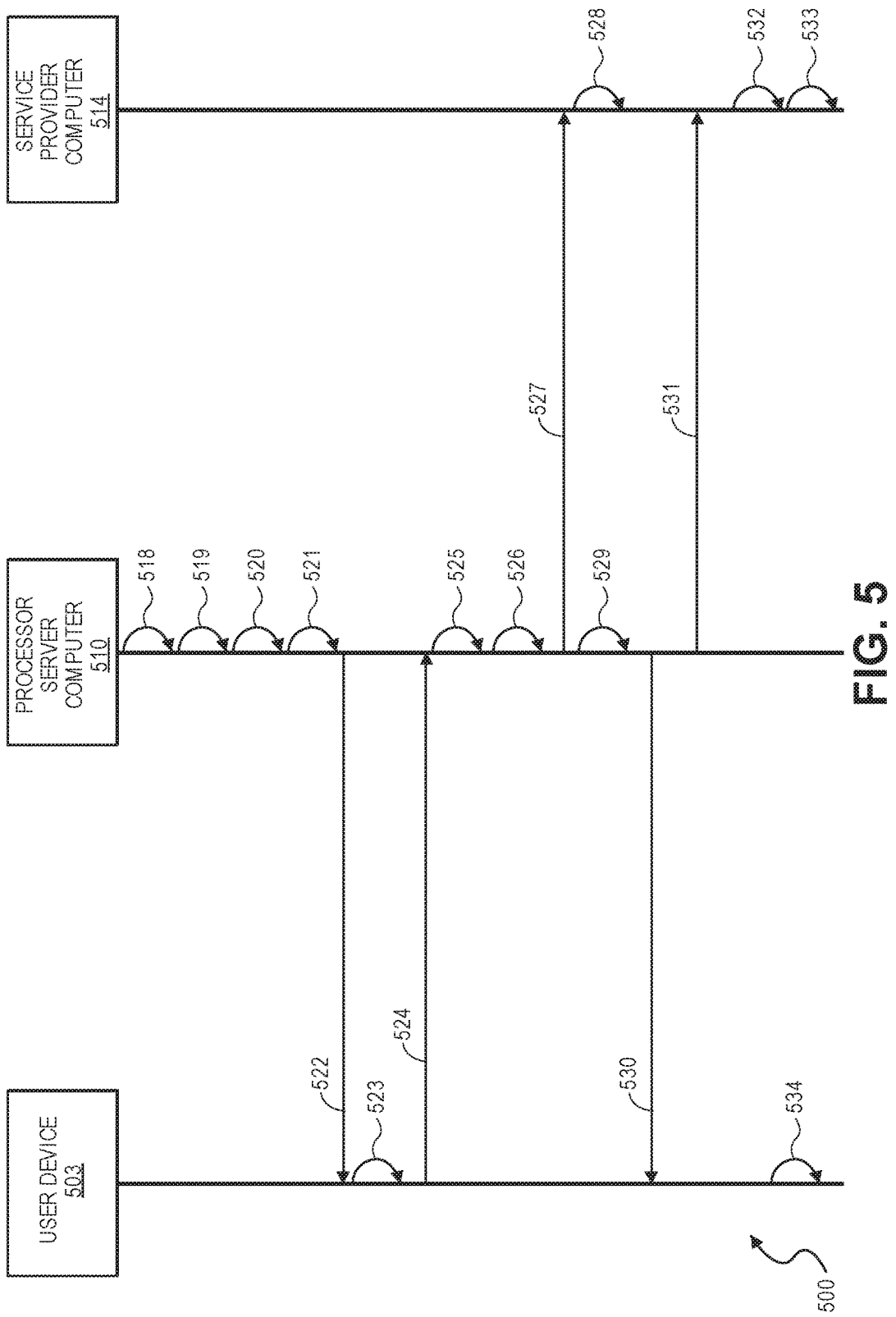
FIG. 5 shows a flow diagram of an exemplary method according to embodiments of the present invention.

FIG. 5 shows an exemplary flow diagram 500 of a method for issuing access data in response to a compromise alert according to embodiments of the present invention. FIG. 5 includes a user device 503 operated by a user, a processor server computer 510, and a service provider computer 514. It is noted that several steps shown in flow 500 may be similar to those described in flow 400 of FIG. 4 and thus are not all explicitly described herein to avoid repetition. For example, steps 518 to 525 of FIG. 5 may be similar to steps 418 to 425 of FIG. 4, respectively. Additionally, steps 531 to 534 of FIG. 5 may be similar to steps 433 to 436 of FIG. 4, respectively.

At step 526, upon processing a response from user device 503 input by the user and determining that first access data is to be disabled based on the response, processor server computer 510 may disable use of the first access data. In some embodiments, processor server computer 510 may disable use of the first access data by deleting the first access data and any related information from its systems. In other embodiments, processor server computer may disable use of the first access data by storing an indication (e.g., flag, blacklist entry, hold, etc.) that the use of the first access data is disabled along with other relevant data (e.g., time or date that the first access data was disabled, etc.).

At step 527, processor server computer 510 may notify service provider computer 514 that the first access data is invalid. In some embodiments, while not explicitly shown in flow 500, processor server computer 510 may also notify other entities that may process requests for access, such as an authorization computer, that the first access data is invalid. This can ensure that the first access data cannot be utilized fraudulently throughout the request processing system. In some embodiments, processor server computer 510 may include a digital signature with the transmitted notification that can be verified by each of the processing entities to ensure that the communications received from processor server computer 510 are valid. In some cases, the first access data may include a first token associated with the user. In an exemplary case, the first token may be a first substitute number (e.g., randomly generated 16-digit number) corresponding to an account number associated with the user's account.

At step 528, service provider computer 514 can disable use of the first access data. In some embodiments, service provider computer 514 may disable use of the first access data by deleting the first access data and any related information from its systems. In other embodiments, service provider computer 514 may disable use of the first access data by storing an indication (e.g., flag, blacklist entry, hold, etc.) that the use of the first access data is disabled along with other relevant data (e.g., time or date that the first access data was disabled, etc.).

At step 529, processor server computer 510 may generate second access data for the user. In some cases, the second access data may include a second token associated with the user. In an exemplary case, the second token may be a second substitute number (e.g., randomly generated 16-digit number) corresponding to the account number associated with the user's account. The first token and the second token may both be associated with the same account associated with the user. Processor server computer 510 may update information in a token vault to store the second token in association with account information corresponding to the account of the user, as well as indicate that the second token, instead of the first token, is now valid for use by the user.

At step 530, processor server computer 510 may send the second access data to user device 503. In some cases, the second access data my include the second token associated with the user. In some embodiments, the user may provide the second access data to a service provider application running on user device 503. The application may be hosted by service provider computer 514, which may then store the received second access data input by the user. In some embodiments, service provider computer 414 may request the user for authentication information (e.g., password, PIN, biometric information, etc.) before storing the received second access data. In other embodiments, the user may not manually input the second access data into user device 503. Instead, processor server computer 510 may automatically communicate with service provider computer 514 to communicate the second access data upon receipt as in steps 531 to 533.

After the second access data, which may include the second token, is sent to and stored by service provider computer 514, as well as provisioned to user device 503 in steps 531-533, the user can utilize the second access data to request access to a resource with user device 503 in step 534. The request may be processed by a plurality of processing entities (e.g., processor server computer 510, transport computer, authorization computer, service provider computer 514, etc.) in a manner such as that described above with respect to the exemplary use case corresponding to flow 400. Ultimately, if processor server computer 510 determines that the request for access to the resource was initiated utilizing the second access data, processor server computer 510 may allow processing of the request to proceed. However, upon receiving a request for access to a resource, if processor server computer 510 determines that the request for access to the resource was initiated utilizing the first access data, processor server computer 510 may decline the request for access to the resource.

Embodiments of the invention enable the second access data to be provisioned upon issuance of the second access data, which can allow the user to immediately utilize the second access data. This process is efficient, takes minimal effort by the user, and provides more flexibility for the user. For example, the process for issuing new access data for the user is efficient, since the user can easily and quickly respond to a compromise alert received by user device 503. This can forgo the user having to perform a typical cumbersome process of providing their authentication information orally over the phone or through a separate online or paper registration process.

Further, embodiments of the invention increase security. For example, the time spent between detection of potentially compromised access data to the issuance of new access data for the user is reduced. This reduces the chances that fraudulent use of the first access data can go undetected. Processing a response to a compromise alert from a user device operated by a user can also enable personal information associated with the user and their user device (e.g., location information, device identifier, etc.) to be gathered in real-time and utilized for authentication before new access data is issued. This is efficient and allows for a meaningful analysis based on comparing historical behavior of the user's previous usage of access data against information related to a current request for access.

Additionally, embodiments of the invention can increase efficiency of the computer system as a whole. Embodiments of the invention improve turnaround times for disabling compromised access data, which allows more fraudulent requests to be terminated before they are further processed by processing entities (e.g., resource provider computer, transport computer, authorization computer, etc.). This reduces the processing performed for handling fraudulent requests, and thus enables more computing resources to be allocated towards processing other valid requests. As a result, the overall efficiency of processing access requests is improved.

It is understood that the flows shown in FIG. 4 and FIG. 5 are not meant to be limiting. In some embodiments, steps described above with respect to flow 400 and flow 500 may be initiated at the same time or in a different order than as shown in FIG. 4 and FIG. 5, respectively.

It is also understood that some steps shown in FIG. 4 and FIG. 5 may be performed by entities other than those described herein. For example, in some cases, the detection of potential fraud at steps 418 or 518 may be conducted by a third party entity that is capable of performing fraud detection processes. The third party entity may relay this information to an appropriate entity, such as a processor server computer or an authorization computer. Additionally, while a case in which a processor server computer sends a compromise alert to a user device is described above in detail, embodiments are not so limited. For example, in some cases, the authorization computer may send the compromise alert to the user device and thus the user device and the authorization computer may communicate directly in order to issue the second access data associated with the user.

Additionally, while exemplary use cases in which the access data includes financial account information are described above, embodiments are not so limited. Embodiments of the invention can be utilized in other non-financial contexts. For example, access data according to embodiments of the invention can be utilized to access any type of resource. An exemplary use case in which access data is utilized to request access to a building is described with respect to FIG. 6.

Figure 6:
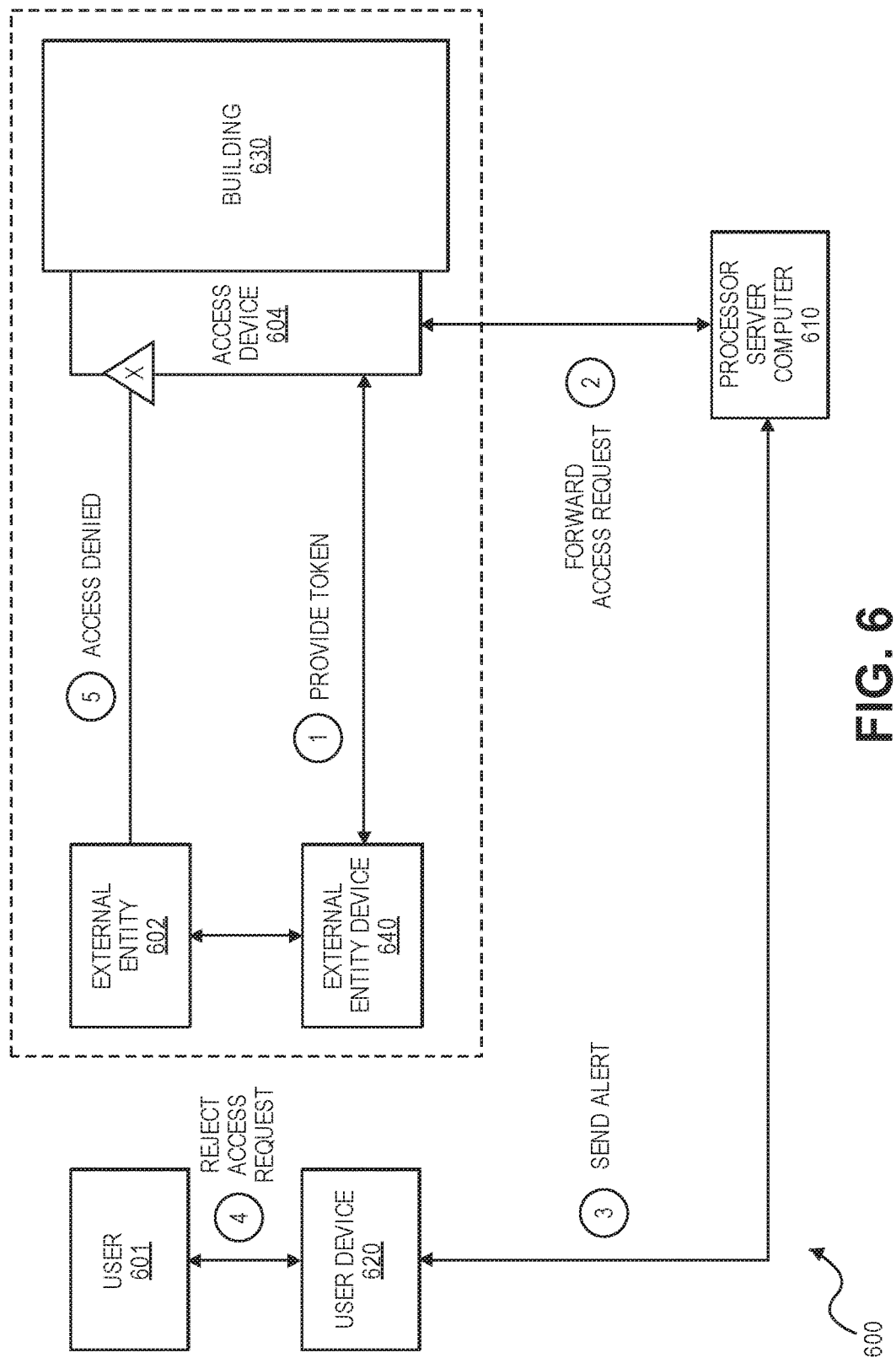
FIG. 6 shows an exemplary flow diagram for requesting access to a building according to embodiments of the present invention.

FIG. 6 shows an exemplary flow 600 for requesting access to a building according to embodiments of the present invention. FIG. 6 includes a user 601 operating a user device 620, as well as an external entity 602 operating an external entity device 640. In this case, external entity 602 may be an entity that is attempting to utilize a token associated with user 601 for fraud. External entity device 640 may be any suitable computing device (e.g., user device, mobile device, server computer, etc.) that can communicate information with other computing devices. FIG. 6 also includes a processor server computer 610, as well as an access device 604 associated with building 630. Access device 604 may be a computing device that can communicate information between computing devices, such as external entity device 640 and processor server computer 610, using suitable communication mechanisms (e.g., NFC, Wi-Fi, Bluetooth, etc.) and may regulate access to building 630.

In flow 600, the token may be information unique to the user operating user device 620. In some cases, the token may be a value (e.g., identifier, password, PIN, etc.) associated with the user. In some implementations, the token may be a combination of multiple pieces of information, at least some of which may be unique to the user. For example, the token may be any combination of one or more of the user's name, address, phone number, device identifier of user device 620, a timestamp, or other information. The token may be generated utilizing any series of operations (e.g., concatenation, bitwise operations, encryption, etc.).

At step 1, external entity device 640 may send, to access device 604, a request to access building 630 with the token associated with user 601. In some cases, external entity 602 may possess external entity device 640 and may bring external entity device 640 in proximity to access device 604. External entity device 640 and access device 604 may detect that they are in proximity to each other, which can cause the token to be transmitted wirelessly from external entity device 640 to access device 604.

At step 2, access device 604 may send the request received from external entity device 640 with the token to processor server computer 610. Processor server computer

610 may determine that the token was utilized for the request and determine information related to the token. For example, processor server computer 610 may determine historical usage data associated with the token, where the historical usage data may be any information associated with previous requests made utilizing the token. Processor server computer 610 may then determine whether the received request is abnormal based on the historical usage data. In some cases, processor server computer 610 may determine that the received request is abnormal if one or more pieces of information (e.g., time of request, location of request, resource requested, etc.) corresponding to the received request deviates to a certain degree from that indicated in the historical usage data. In flow 600, processor server computer 610 may determine that the received request is abnormal and thus determine that it is potentially compromised.

At step 3, processor server computer 610 may generate and send a compromise alert to user device 620. Processor server computer 610 may recognize to send the compromise alert to user device 620 based on determining that the token is associated with user 601. Processor server computer 610 may send the compromise alert to user device 620 upon determining contact information associated with user 601. User device 620 may receive the compromise alert by any suitable communications channel (e.g., text message, email, in-app notification, etc.).

At step 4, user 601 may respond to the compromise alert. In some embodiments, the compromise alert may prompt the user to indicate whether the received request was actually conducted by user 601. User 601 may then input a response into user device 620. In flow 600, user 601 may respond to the compromise alert by indicating that they reject the received request for access utilizing the token because they do not recognize the received request. The response from user 601 may be forwarded from user device 620 to processor server computer 610, which may initiate a process to disable use of the token. Processor server computer 610 may also send an indication to access device 604 that the received request is likely fraudulent.

At step 5, access device 604 may deny external entity 602 access to building 630. In some cases, access device 604 may regulate an entrance (e.g., door) of building 630. Access device 604 may determine that the entrance is to remain locked based on the indication received from processor server computer 610 that the request received from external entity device 640 is likely fraudulent. As a result, external entity 602 operating external entity device 640 can no longer utilize the token to enter building 630. In some embodiments, processor server computer 610 may also initiate a process to generate a new token for user 601 so that they can utilize the new token to request access to building 630 in the future.

As shown in flow 600, embodiments of the invention can be applied to any suitable situations in which a user requests access to a resource. This process is efficient, takes minimal effort by the user, and provides more flexibility for the user. Additionally, the time spent between detection of potentially compromised access data (e.g., token utilized by external entity device 640) and the issuance of new access data (e.g., new token issued for user 601) for the user is reduced. This reduces the chances that fraudulent use of the first access data can go undetected, which increases security of the computer system as a whole.

It is understood that additional methods and processes may be included within the methods described herein and may be recognized by one of ordinary skill in the art, in light of the description below. Further, in some embodiments of the present invention, the described methods may be combined, mixed, and matched, as one of ordinary skill would recognize.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   receiving, by a server computer, a first request for access to a resource;
   determining, using a compromise engine of the server computer, that first access data associated with the first request for access to the resource has been potentially compromised based at least in part on information associated with historical interactions using the first access data with the resource and a threshold, the first access data associated with a user;
   sending, by the server computer to a user device associated with the user, a compromise alert that indicates a potential compromise of the first access data associated with the user;
   receiving, by the server computer, a request input by the user into the user device to issue second access data in response to the compromise alert, and identification information associated with the user or the user device;
   authenticating, by the server computer, the user based at least in part on the identification information;
   in response to authenticating the user:
      initiating, by the server computer, generation of the second access data, wherein the user can utilize the second access data to request access to the resource; and
      transmitting, by the server computer, the second access data to the user device.

2. The method of claim 1, wherein initiating generation of the second access data comprises:
   sending, by the server computer, a second request to an authorization computer to issue the second access data for the user, wherein the authorization computer generates the second access data; and
   receiving, by the server computer, the second access data from the authorization computer.

3. The method of claim 2, further comprising:
   generating, by the server computer, a token to include in the second access data, wherein the user can utilize the token to request access.

4. The method of claim 2, further comprising:
   disabling, by the server computer, use of the first access data.

5. The method of claim 4, further comprising:
   receiving, by the server computer, a third request for access to the resource;
   determining, by the server computer, that the third request for access to the resource was initiated using the first access data; and
   declining, by the server computer, the third request for access to the resource.

6. The method of claim 1, wherein initiating generation of the second access data comprises:

invalidating, by the server computer, the first access data including a first token; and
generating, by the server computer, the second access data including a second token, wherein the user can utilize the second token to request access to the resource.

7. The method of claim 6, further comprising:
   receiving, by the server computer, a second request for access to the resource;
   determining, by the server computer, that the second request for access to the resource was initiated using the invalidated first access data; and
   declining, by the server computer, the second request for access to the resource.

8. The method of claim 1, further comprising:
   generating, by the server computer, a session identifier that is unique to the user device;
   sending, by the server computer, one or more messages with the session identifier;
   receiving, by the server computer, one or more messages with the session identifier; and
   determining, by the server computer, that the one or more messages are associated with the user device based on the session identifier.

9. The method of claim 1, further comprising, prior to determining that the first access data associated with the user has been potentially compromised:
   generating, by the server computer, the compromise alert; and
   determining, by the server computer, contact information associated with the user for sending the compromise alert to the user device.

10. A server computer comprising:
    a processor; and
    a memory element comprising code, executable by the processor, for implementing a method comprising:
       receiving a first request for access to a resource;
       determining, using a compromise engine, that first access data associated with the first request for access to the resource has been potentially compromised based at least in part on information associated with historical interactions using the first access data with the resource and a threshold, the first access data associated with a user;
       sending, to a user device associated with the user, a compromise alert that indicates a potential compromise of the first access data associated with the user;
       receiving a request input by the user into the user device to issue second access data in response to the compromise alert, and identification information associated with the user or the user device;
       authenticating the user based at least in part on the identification information;
       initiating, in response to authenticating the user, generation of the second access data, wherein the user can utilize the second access data to request access to the resource; and
       transmitting the second access data to the user device.

11. The server computer of claim 10, wherein the step of initiating generation of the second access data in the method comprises:
    sending a second request to an authorization computer to issue the second access data for the user, wherein the authorization computer generates the second access data; and
    receiving the second access data from the authorization computer.

12. The server computer of claim 11, the method further comprising:
   generating a token to include in the second access data, wherein the user can utilize the token to request access.

13. The server computer of claim 11, the method further comprising:
   disabling use of the first access data.

14. The server computer of claim 13, the method further comprising:
   receiving a third request for access to the resource;
   determining that the third request for access to the resource was initiated using the first access data; and
   declining the third request for access to the resource.

15. The server computer of claim 10, wherein the step of initiating generation of the second access data in the method comprises:
   invalidating the first access data including a first token; and
   generating the second access data including a second token, wherein the user can utilize the second token to request access to the resource.

16. The server computer of claim 15, the method further comprising:
   receiving a second request for access to the resource;
   determining that the second request for access to the resource was initiated using the invalidated first access data; and
   declining the second request for access to the resource.

17. The server computer of claim 15, the method further comprising:
   sending information indicating that the first access data is invalid to a service provider computer, wherein the service provider computer invalidates use of the first access data.

18. A user device associated with a user comprising:
a processor; and
a memory element comprising code, executable by the processor, for implementing a method comprising:
   receiving, from a server computer, a compromise alert that indicates a potential compromise of first access data associated with a request to access a resource, the first access data associated with the user, the potential compromise of the first access data determined by the server computer based at least in part on information associated with historical interactions using the first access data with the resource and a threshold;
   receiving a request input by the user to issue second access data in response to the compromise alert;
   sending, to the server computer, the request to issue the second access data and identification information associated with the user or the user device; and
   receiving, from the server computer, the second access data, wherein the user can utilize the second access data to request access to the resource, the second access data provided by the server computer in response to authenticating the user based at least in part on the identification information.

\* \* \* \* \*